United States Patent [19]
Ito

[11] Patent Number: 6,091,519
[45] Date of Patent: Jul. 18, 2000

[54] GRADATION TRANSFORMING METHOD AND APPARATUS

[75] Inventor: Wataru Ito, Kanagawa-ken, Japan

[73] Assignee: Fuji Photo Film Co., Ltd., Kanagawa-ken, Japan

[21] Appl. No.: 09/111,864

[22] Filed: Jul. 8, 1998

[30] Foreign Application Priority Data

Jul. 8, 1997 [JP] Japan .................................. 9-182657
Jun. 5, 1998 [JP] Japan .................................. 10-156929

[51] Int. Cl.$^7$ ................................. G03F 3/08; G06K 9/00
[52] U.S. Cl. ........................................... 358/521; 382/167
[58] Field of Search ............................. 358/518, 521, 358/525; 382/162, 167

[56] References Cited

U.S. PATENT DOCUMENTS 5,426,517  6/1995  Schwartz ................................ 358/521
5,668,890  9/1997  Winkleman ........................... 358/521

Primary Examiner—Kimberly A. Williams

[57] ABSTRACT

A spatial-domain processing is carried out on an image signal, which is made up of a series of original picture element values of picture elements constituting an image, the values being expressed with integral numbers, and spatial-domain processed signal values, which correspond to the respective picture elements and are represented by real numbers, are thereby obtained. Each of the spatial-domain processed signal values is multiplied by a factor of n, where n is larger than 1 and represents a real number other than integral numbers. In this manner, n-fold signal values are obtained. Each of the n-fold signal values is approximately represented by an integral number. The thus obtained integral number is taken as a new picture element value of the corresponding picture element constituting the image. Gradation transform is thus carried out such that no artifact may occur at a gradation part in an image, which is reproduced from the image signal obtained from the gradation transform.

20 Claims, 4 Drawing Sheets

GRADATION TRANSFORMING METHOD AND APPARATUS

BACKGROUND OF THE INVENTION

1. Field of the Invention

This invention relates to a gradation transforming method and apparatus for use in raising gradation.

2. Description of the Prior Art

In cases where an image signal is to be transformed between different color spaces, for example, between the YCC color space and the RGB color space, it often becomes necessary to carry out processing for raising the gradient of the gradation curve of the image signal. Specifically, the definition specifying with which dynamic range the signal values expressed with, for example, 8-bit, 0 to 255 levels are to be allocated to an actual scene varies for different color spaces. Therefore, when the image signal is transformed between different color spaces, it often becomes necessary to transform the gradient of the gradation curve with respect to the scene from a small gradient to a large gradient. In cases where gradation transforming process for increasing the gradient of the gradation curve is carried out with respect to the picture element values, which are expressed with integral numbers, a discontinuous portion often occurs with the picture element values, which have been obtained from the gradation transform, in a scene of gradation containing little noise, i.e. in a region in which the original picture element values change continuously. The discontinuous portion of the picture element values appears as a contour line-like artifact in a visible image reproduced from the image signal having been obtained from the gradation transform.

Discontinuity of the picture element values, which have been obtained from the gradation transform, occurs in the manner described below. For example, incases where the gradient of the gradation curve is increased by a factor of 1.2 with respect to the picture element values expressed with 8-bit, 0 to 255 levels, the original signal values of 0, 1, 2, 3, 4, 5, 6, 7, and 8 are multiplied by 1.2, and the values of 0, 1.2, 2.4, 3.6, 4.8, 6.0, 7.2, 8.4, and 9.6 are thereby obtained. In order for the thus obtained values to be approximately represented by integral numbers, the thus obtained values are rounded to the nearest integral numbers, and the values of 0, 1, 2, 4, 5, 6, 7, 8, and 10 are thereby obtained. The signal values obtained from the transform do not contain values of 3 and 9. Specifically, the values of 3, 9, and the like, disappear due to the gradation transform at an image portion, at which the picture element values should change continuously. Therefore, the discontinuous portion occurs with the picture element values.

Accordingly, in cases where the gradation transform, in which the signal values are multiplied by 1.2 and the thus obtained values are then approximately represented by integral numbers in the manner described above, is carried out on a signal, in which the picture element values change in the pattern of, for example, 2, 2, 2, 2, 3, 3, 3, 3, 4, 4, 4, 4 at a gradation part in an image, signal values of 2, 2, 2, 2, 4, 4, 4, 4, 5, 5, 5, 5, are obtained from the gradation transform. Thus an artifact occurs in the scene of gradation containing little noise in the original image. In order for the gradation containing little noise as in the original image to be obtained in the image, which is obtained from the gradation transform, it is desired that the picture element values in the aforesaid signal become continuous as in the pattern of 2, 2, 2, 3, 3, 4, 4, 4, 5, 5, 5, 5 after being transformed.

SUMMARY OF THE INVENTION

The primary object of the present invention is to provide a gradation transforming method, wherein gradation transform for raising the gradient of gradation of an image, i.e. increasing the gradient of gradation by a factor of n, where n is larger than 1 and represents a real number other than integral numbers, is carried out on the image signal representing the image, such that no artifact may occur in an image represented by a transformed image signal having been obtained by multiplying the original picture element values, which are represented by integral numbers, by n.

Another object of the present invention is to provide an apparatus for carrying out the gradation transforming method.

The present invention provides a gradation transforming method for an image, wherein each of original picture element values of picture elements constituting an image, which values are expressed with integral numbers, is multiplied by a factor of n, where n is larger than 1 and represents a real number other than integral numbers, the value obtained from the multiplication is then approximately represented by an integral number, and the thus obtained integral number is taken as a new picture element value of the corresponding picture element constituting the image, the method comprising the steps of:

i) carrying out a spatial-domain processing on an image signal, which is made up of a series of the original picture element values of the picture elements constituting the image, spatial-domain processed signal values, which correspond to the respective picture elements and are represented by real numbers, being thereby obtained, ii) multiplying each of the spatial-domain processed signal values by a factor of n, n-fold signal values being thereby obtained, and iii) approximately representing each of the n-fold signal values by an integral number, the new picture element value being thereby obtained.

In the gradation transforming method in accordance with the present invention, the spatial-domain processing should preferably be a filtering processing.

Also, the filtering processing may comprise the steps of:

a) utilizing a filter having a predetermined size, b) carrying out a predetermined operation by using the original picture element values of all picture elements, which are located in a region covered by the filter when a predetermined position on the filter is located at a position corresponding to a picture element of interest, and filter factors of the filter, which correspond to the all picture elements, and c) taking a value, which has been obtained from the predetermined operation, as the spatial-domain processed signal value, which corresponds to the picture element of interest.

Alternatively, the filtering processing may comprise the steps of:

a) utilizing a filter having a predetermined size, b) carrying out a predetermined operation by using the original picture element values of all picture elements, which are located in a region covered by the filter when a predetermined position on the filter is located at a position corresponding to a picture element of interest, and filter factors of the filter, which correspond to the all picture elements, c) taking a value, which has been obtained from the predetermined operation, as the spatial-domain processed signal value, which corresponds to the picture element of interest, in cases where a difference between the value, which has been obtained from the predetermined operation, and the original picture element value of the picture element of interest is smaller than a predetermined value, and d) taking the original picture element value of the picture element of interest as the spatial-domain processed signal value, which corresponds to the picture element of interest, in cases where the difference between the value, which has been obtained from the predetermined operation, and the original picture element value of the picture element of interest is not smaller than the predetermined value.

In the two kinds of the filtering processings described above, the filter factors of the filter, which correspond to the all picture elements, may take the same value, and a mean value of the original picture element values of the all picture elements, which are located in the region covered by the filter, may be taken as the spatial-domain processed signal value, which corresponds to the picture element of interest.

Alternatively, the filter factors of the filter, which correspond to the all picture elements, may be determined such that the original picture element value of the picture element of interest may be weighted.

As another alternative, the filtering processing may comprise the steps of:

a) carrying out an interpolating operation with a predetermined interpolating function, which attaches importance to stability, on the original picture element values of a plurality of picture elements, which are located in the vicinity of a picture element of interest, an interpolated value, which corresponds to the picture element of interest, being thereby obtained, and b) taking the interpolated value as the spatial-domain processed signal value, which corresponds to the picture element of interest.

The predetermined interpolating function, which attaches importance to stability, is ordinarily referred to as the smooth interpolating function. For example, the predetermined interpolating function may be an interpolating function having interpolation coefficients, each of the interpolation coefficients having been obtained by linearly combining interpolation coefficients, which correspond to each other and are set for each of the picture elements, in a cubic spline interpolating function and a B spline interpolating function, the interpolation coefficients being linearly combined in a predetermined ratio. Alternatively, the predetermined interpolating function, which attaches importance to stability, may be the one utilizing the B spline interpolating function alone. However, the interpolating operation, which utilizes the, combination of the B spline interpolating function and the cubic spline interpolating function, is advantageous in keeping the image sharpness.

The present invention also provides a gradation transforming apparatus for an image, wherein each of original picture element values of picture elements constituting an image, which values are expressed with integral numbers, is multiplied by a factor of n, where n is larger than 1 and represents a real number other than integral numbers, the value obtained from the multiplication is then approximately represented by an integral number, and the thus obtained integral number is taken as a new picture element value of the corresponding picture element constituting the image, the apparatus comprising:

i) a spatial-domain processing means for carrying out a spatial-domain processing on an image signal, which is made up of a series of the original picture element values of the picture elements constituting the image, and thereby obtaining spatial-domain processed signal values, which correspond to the respective picture elements and are represented by real numbers, ii) a magnification ratio processing means for multiplying each of the spatial-domain processed signal values by a factor of n, and thereby obtaining n-fold signal values, and iii) an integral number processing means for approximately representing each of the n-fold signal values by an integral number, and thereby obtaining the new picture element value.

With the gradation transforming method and apparatus in accordance with the present invention, the spatial-domain processing, such as the filtering processing, is carried out on the image signal, which is made up of a series of the original picture element values of the picture elements constituting the image. The spatial-domain processed signal values, which correspond to the respective picture elements and are represented by real numbers, are thereby obtained. Each of the spatial-domain processed signal values is then multiplied by a factor of n, where n is larger than 1 and represents a real number other than integral numbers, and the n-fold signal values are thereby obtained. Each of the n-fold signal values is approximately represented by an integral number, and the new picture element value is thereby obtained. With the spatial-domain processing, the spatial-domain processed signal value, which corresponds to the picture element of interest, can be obtained such that the spatial-domain processed signal value may be connected smoothly with the original picture element values of the neighboring picture elements. Therefore, the new picture element value can take a value, which could not be obtained in cases where the original picture element values are directly multiplied by a factor of n and the thus obtained products are approximately represented by integral numbers. Particularly, at an image portion in which the original picture element values of consecutive picture elements change little by little as in a gradation part, the new picture element values can be obtained from the gradation transform such that they may change continuously. As a result, the occurrence of an artifact can be restricted in the image reproduced from the image signal, which has been obtained from the gradation transform.

DESCRIPTION OF THE PREFERRED EMBODIMENTS

The present invention will hereinbelow be described in further detail with reference to the accompanying drawings.

Figure 1:
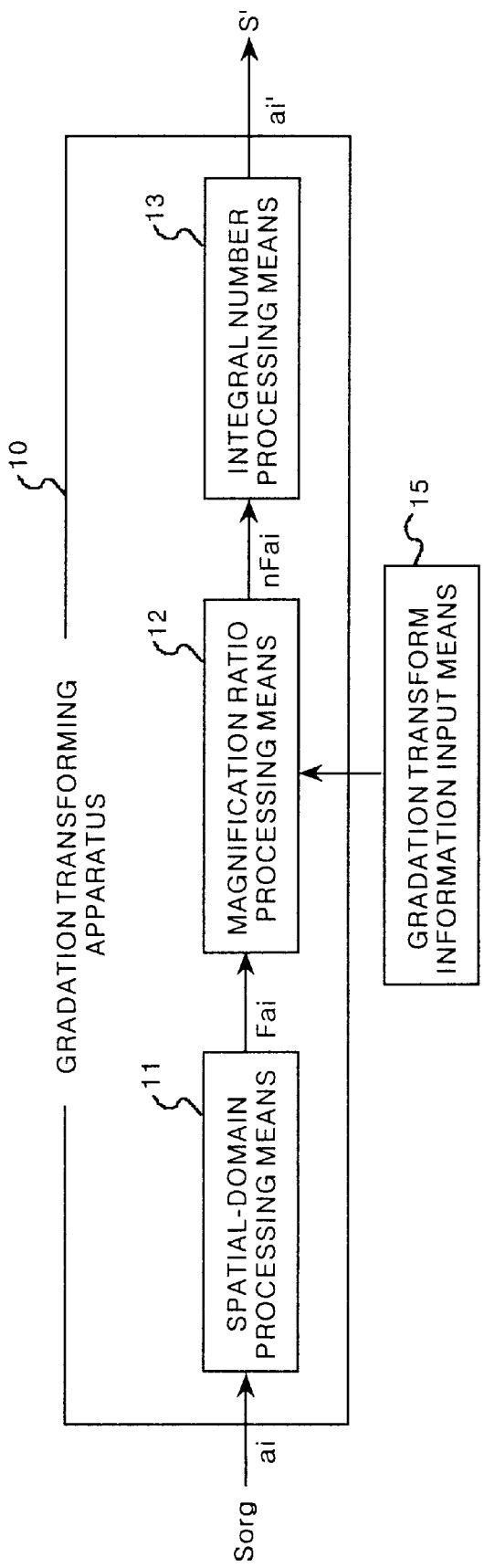
FIG. 1 is a block diagram showing a gradation transforming apparatus for carrying out a first embodiment of the gradation transforming method in accordance with the present invention.

FIG. 1 shows a first embodiment of the gradation transforming apparatus in accordance with the present invention. A gradation transforming apparatus 10 in accordance with the present invention comprises a spatial-domain processing means 11 for carrying out a filtering processing on a received original image signal $Sorg(a_{i,j})$ and thereby obtaining filtering processed signal values $Fa_{i,j}$. The gradation transforming apparatus 10 also comprises a magnification ratio processing means 12 for multiplying each of the filtering processed signal values $Fa_{i,j}$, which have been obtained from the spatial-domain processing means 11, by a factor of n in accordance with information, which is specified from a gradation transform information input means 15, such that desired gradation may be obtained. From the magnification ratio processing means 12, n-fold signal values $nFa_{i,j}$ are obtained. The gradation transforming apparatus 10 further comprises an integral number processing means 13 for approximately representing each of the n-fold signal values $nFa_{i,j}$, which have been obtained from the magnification ratio processing means 12, by an integral number. In this case, n is larger than 1 and represents a real number other than integral numbers.

The original image signal Sorg, in which the original picture element values $a_{i,j}$ of picture elements $A_{i,j}$ constituting an image are expressed with integral numbers, is fed from an image input apparatus (not shown) into the gradation transforming apparatus 10. In the gradation transforming apparatus 10, firstly, the spatial-domain processing means 11 carries out a predetermined filtering processing on the original image signal Sorg, and a filtering processed signal value $Fa_{i,j}$, which corresponds to each picture element $A_{i,j}$ in the image, is calculated from the original picture element values of a plurality of picture elements, which are located in the vicinity of the picture element $A_{i,j}$. The original picture element values $a_{i,j}$ in the original image signal Sorg are integral numbers. The filtering processed signal values $Fa_{i,j}$ are real numbers.

Thereafter, in the magnification ratio processing means 12, each of the filtering processed signal values $Fa_{i,j}$ is multiplied by a factor of n in accordance with the information inputted from the gradation transform information input means 15. The information inputted from the gradation transform information input means 15 may be the apparatus information concerning the image input apparatus and an image reproducing apparatus. In the magnification ratio processing means 12, the gradation transform magnification ratio n is determined in accordance with the characteristics of the image input apparatus and the image reproducing apparatus. The information inputted from the gradation transform information input means 15 is not limited to the apparatus information, and the information representing the gradation transform magnification ratio n may be directly inputted from the gradation transform information input means 15. As another alternative, color space information, for example, the information representing the transform from the YCC space to the RGB space, may be inputted from the gradation transform information input means 15 into the magnification ratio processing means 12, and an appropriate gradation transform magnification ratio n may thereby be selected in the magnification ratio processing means 12.

Each of the n-fold signal values $nFa_{i,j}$, which have been obtained from the magnification ratio processing means 12, is rounded to the nearest integral number by the integral number processing means 13. The values, which have thus been obtained with respect to the picture elements $A_{i,j}$ by the integral number processing means 13, are taken as picture element values $a_{i,j}'$ of the picture elements $A_{i,j}$ obtained from the gradation transform. In this manner, the gradation transform is carried out in the gradation transforming apparatus 10, and an image signal S', which is made up of a series of the picture element values $a_{i,j}'$ obtained from the gradation transform, is obtained. The image signal S' is fed into the image reproducing apparatus (not shown).

Figure 2:
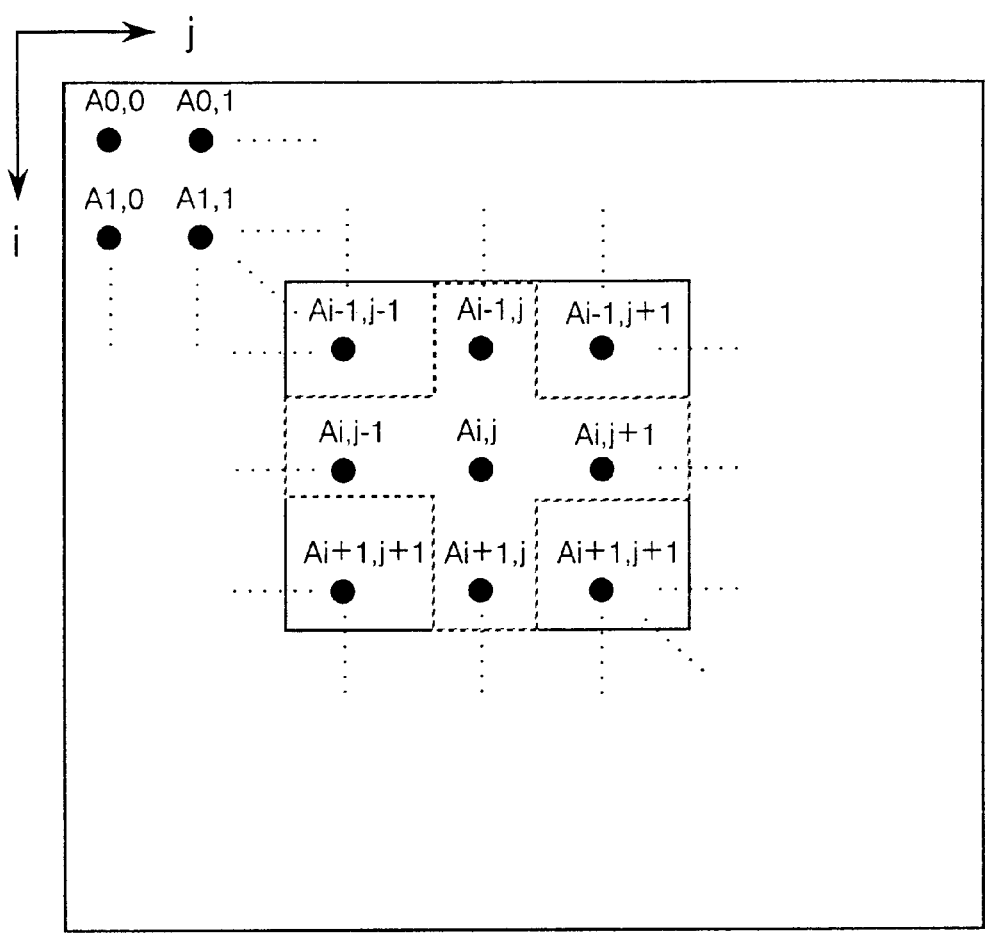
FIG. 2 is an explanatory view showing picture elements in an original image and how a filtering processing is carried out for obtaining a filtering processed signal value, which corresponds to a picture element.

In the first embodiment, the spatial-domain processing means 11 carries out the filtering processing on the original image signal Sorg by using a mean value filter. The mean value filter has the characteristics such that, when a predetermined position on the filter is located at a position corresponding to a picture element of interest, the filter factors of the filter, which correspond to all picture elements located within the size of the filter, may have the same value. Since the sum of the values of the filter is equal to 1, the reciprocal of the number of the picture elements located within the size of the filter is equal to the filter value. FIG. 2 is an explanatory view showing the picture elements in the original image and how the filtering processing is carried out for obtaining a filtering processed signal value, which corresponds to a picture element. The filtering processed signal value $Fa_{i,j}$, which corresponds to a picture element of interest $A_{i,j}$, is calculated with the formula shown below.

$$Fa_{i,j} = \left(\sum_{k=-n}^{n}\sum_{l=-m}^{m} a_{i+k,j+l}\right) \Big/ (2n+1)\cdot(2n+1)$$

The operation with the formula shown above is carried out for each of the picture elements, and a filtering processed signal corresponding to the entire area of the image is thereby obtained. In the formula shown above, the values of m and n are selected appropriately in accordance with the sampling intervals (picture element intervals) which are employed in obtaining the original image signal Sorg, the characteristics of the original image, the kind of desired image processing, and the like. The values of m and n determine the filter size. In the calculation, with respect to picture elements located at an end of the image, the picture element values of the picture elements located at the end are assumed to be continuous.

An example of gradation transform in the first embodiment will be described hereinbelow. In this example, as an aid in facilitating the explanation, a one-dimensional mean value filter having a size of 3×1 picture elements is employed, and the gradation transform magnification ratio n is set to be 1.2. The filtering processed signal value $Fa_i$ corresponding to a picture element $A_i$ is represented by a mean value of the original picture element value $a_i$ of the picture element $A_i$ and the picture element values $a_{i-1}$, $a_{i+1}$ of the picture elements $A_{i-1}$, $A_{i+1}$, respectively, which are located on both sides of the picture element $A_i$.

$Fa_i = (a_{i-1} + a_i + a_{i+1})/3$ (Filter values: ⅓, ⅓, ⅓)

In cases where the filtering processing is carried out on an original image signal Sorg, in which the original picture element values take continuous values of 2, 2, 2, 2, 3, 3, 3, 3, 4, 4, 4, 4, and in accordance with the formula shown above in the spatial-domain processing means 11, filtering processed signal values of 2.0, 2.0, 2.0, 2.33, 2.67, 3.0, 3.0, 3.33, 3.67, 4.0, 4.0, 4.0 are obtained with respect to the picture elements. Multiplication of the filtering processed signal values by a factor of 1.2 in the magnification ratio processing means 12 yields values of 2.4, 2.4, 2.4, 2.8, 3.20, 3.6, 3.6, 4.00, 4.40, 4.8, 4.8, 4.8. When the thus obtained values are rounded to the nearest integral numbers in the integral number processing means 13, new picture element values of 2, 2, 2, 3, 3, 4, 4, 4, 4, 5, 5, 5 are obtained. In this manner, the image signal S' resulting from the gradation transform is obtained. In the thus obtained image signal S', as for a gradation part in the original image, i.e. as for an image portion in which the original picture element values of consecutive picture elements change little by little, the new picture element values are obtained from the gradation transform such that they may change continuously. As a result, a reproduced image can be obtained from the image signal S' such that no artifact may occur at the gradation part.

In the first embodiment described above, as an aid in facilitating the explanation, the one-dimensional filter is employed. Ordinarily, a two-dimensional mean value filter for calculating a mean value of the picture element values of nine neighboring picture elements or five neighboring picture elements may be employed. In cases where the filtering processed signal value $Fa_{i,j}$ corresponding to the picture element $A_{i,j}$ is to be calculated from the picture element values of nine neighboring picture elements, the filter having a size of 3×3 picture elements surrounded by the solid lines in FIG. 2 may be employed. Also, the calculation may be made with the formula shown below.

$$Fa_{i,j} = \left( \sum_{k=-1}^{1} \sum_{l=-1}^{1} a_{i+k,j+l} \right) / 9$$

In cases where the filtering processed signal value $Fa_{i,j}$ corresponding to the picture element $A_{i,j}$ is to be calculated from the picture element values of five neighboring picture elements, the calculation may be made from the picture element values of the five neighboring picture elements, which are located in the cross-shaped region surrounded by the dotted lines in FIG. 2, with the formula shown below.

$$Fa_{a,j} = (a_{i-1,j} + a_{i,j-1} + a_{i,j} a_{i,j+1} a_{i+1,j})/5$$

A second embodiment of the gradation transforming apparatus in accordance with the present invention will be described hereinbelow.

Figure 3:
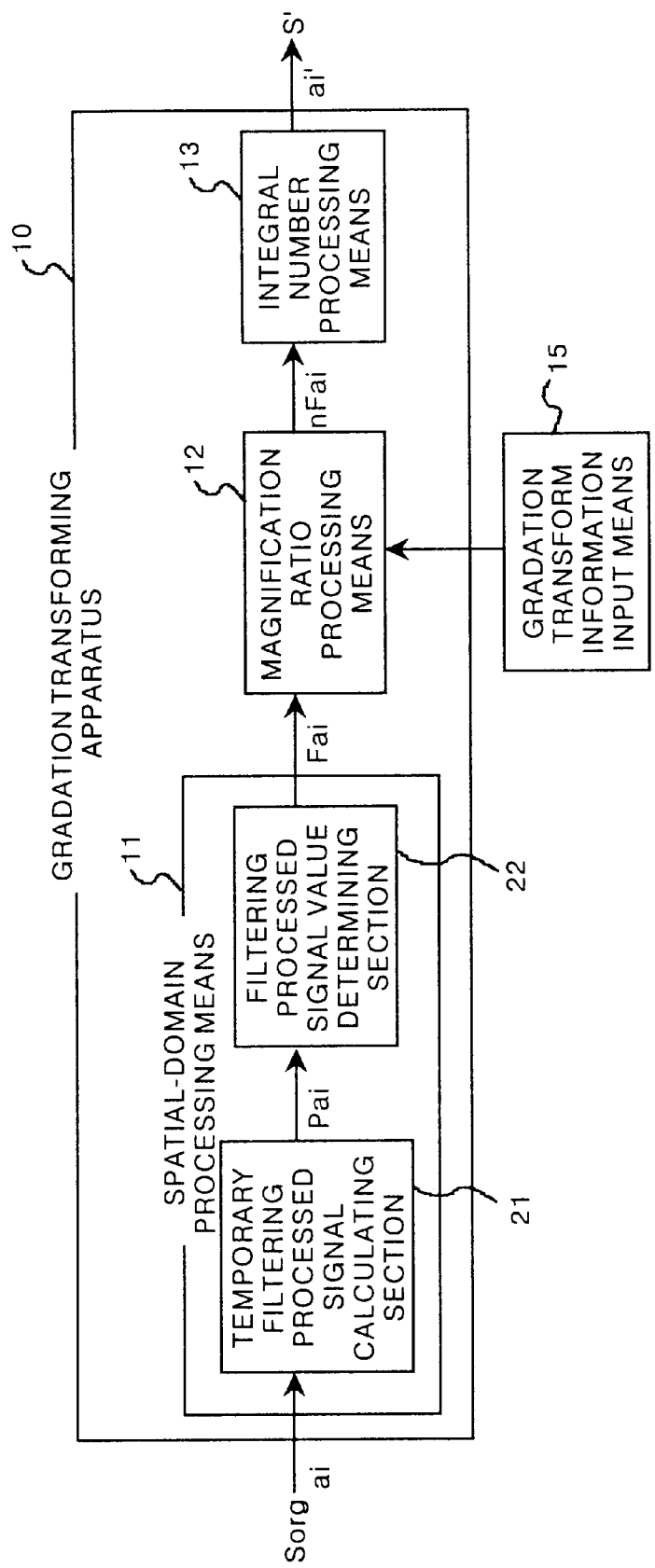
FIG. 3 is a block diagram showing a gradation transforming apparatus for carrying out a second embodiment of the gradation transforming method in accordance with the present invention.

As illustrated in FIG. 3, in the gradation transforming apparatus 10, which is the second embodiment, the spatial-domain processing means 11 is constituted of a temporary filtering processed signal calculating section 21 and a filtering processed signal value determining section 22. In the temporary filtering processed signal calculating section 21, temporary filtering processed signal values $Pa_{i,j}$ are calculated with the same filtering processing as that in the first embodiment described above. In the image reproduced from the temporary filtering processed signal values $Pa_{i,j}$, the edge of the image becomes unsharp. Therefore, in the filtering processed signal value determining section 22, only the temporary filtering processed signal values $Pa_{i,j}$ corresponding to image portions, at which the picture element values change continuously and which are other than the edge of the image, are taken as the filtering processed signal values $Fa_{i,j}$. With respect to the edge of the image, the original picture element values $a_{i,j}$ are taken as the filtering processed signal values $Fa_{i,j}$.

An example of gradation transform in the second embodiment will be described hereinbelow. In this example, as in the first embodiment, as an aid in facilitating the explanation, the one-dimensional mean value filter having a size of 3×1 picture elements is employed, and the gradation transform magnification ratio n is set to be 1.2. The temporary filtering processed signal value $Pa_{i,j}$ corresponding to the picture element $A_i$ is represented by the mean value of the original picture element value $a_i$ of the picture element $A_i$ and the picture element values $a_{i-1}$, $a_{i+1}$ of the picture elements $A_{i-1}$, $A_{i+1}$, respectively, which are located on both sides of the picture element $A_i$.

$$Pa_i(a_{i-1} + a_i + a_{i+3})/3$$

In this case, when $a_i + \alpha < Pa_i$ or $a_i - \alpha > Pa_i$, it is regarded that the picture element $A_i$ is the one located at the edge of the image, and the original picture element value $a_i$ is taken as the filtering processed signal values $Fa_i$. When $a_i - \alpha \leq Pa_i \leq a_i + \alpha$, $Pa_i$ is taken as the filtering processed signal values $Fa_i$. By way of example, $\alpha$ takes a value of 1.

In an original image signal Sorg, a discontinuous portion may occur between the picture element values of adjacent picture elements. For example, in an original image signal Sorg composed of the original picture element values of 2, 2, 2, 2, 3, 3, 3, 3, 4, 4, 4, 4, 10, 10, 10, 10, a discontinuous portion occurs between 4 and 10. In cases where the temporary filtering processing is carried out on such an original image signal Sorg and in accordance with the formula shown above in the temporary filtering processed signal calculating section 21, temporary filtering processed signal values of 2.0, 2.0, 2.0, 2.33, 2.67, 3.0, 3.0, 3.33, 3.67, 4.0, 4.0, 6.0, 8.0, 10.0, 10.0, 10.0, are obtained with respect to the picture elements. In the filtering processed signal value determining section 22, in cases where the difference between the original picture element value $a_{i,j}$ and the temporary filtering processed signal value $Pa_{i,j}$ with respect to each picture element is smaller than 1, the temporary filtering processed signal value $Pa_{i,j}$ is taken as the filtering processed signal value $Fa_{i,j}$. Also, in cases where the difference between the original picture element value $a_{i,j}$ and the temporary filtering processed signal value $Pa_{i,j}$ with respect to each picture element is not smaller than 1, the original picture element value $a_{i,j}$ is taken as the filtering processed signal value $Fa_{i,j}$. In this manner, values of 2.0, 2.0, 2.0, 2.33, 2.67, 3.0, 3.0, 3.33, 3.67, 4.0, 4.0, 4.0, 10.0, 10.0, 10.0, are obtained. Multiplication of the filtering processed signal values by a factor of 1.2 in the magnification ratio processing means 12 yields values of 2.4, 2.4, 2.4, 2.80, 3.20, 3.6, 3.6, 4.00, 4.40, 4.8, 4.8, 4.8, 12.0, 12.0, 12.0. When the thus obtained values are rounded to the nearest integral numbers in the integral number processing means 13, new picture element values of 2, 2, 2, 3, 3, 4, 4, 4, 4, 5, 5, 5, 12, 12, 12 are obtained. In this manner, the image signal S' resulting from the gradation transform is obtained. In the thus obtained image signal S', as for a gradation part in the original image, i.e. as for an image portion in which the original picture element values of consecutive picture elements change little by little, the new picture element values are obtained from the gradation transform such that they may change continuously. Also, as for an edge in the original image, at which the picture element values are discontinuous, the new picture element values are obtained from the gradation transform such that the discontinuity may be kept. Accordingly, a reproduced image can be obtained from the image signal S' such that no artifact may occur at the gradation part and such that the sharpness may be kept in the entire area of the image.

In the second embodiment, as in the first embodiment, a two-dimensional mean value filter for calculating a mean value of the picture element values of nine or five neighboring picture elements may be employed.

In the first and second embodiments described above, the filtering processing is carried out by using the mean value filter. Alternatively, in the filtering processing, a filter, which has filter factors such that the original picture element value of the picture element of interest may be weighted, may be employed. For example, in cases where a filter having a size of 3×3 picture elements is employed, the filter factor corresponding to the picture element of interest may be set to be 1/5, and the filter factors corresponding to the other picture elements, which are located within the filter size, may be set to be 1/10. As another alternative, a Gaussian filter, in which the filter factors are represented by Gaussian functions, may be employed. In cases where such a weighting filter is employed, filtering processed signal values can be obtained such that less blurring may occur particularly at the edge in the image than when the mean value filter is employed as in the first embodiment described above. Therefore, a reproduced image, in which the occurrence of an artifact at the gradation part is restricted and the sharpness of the edge in the image is kept comparatively high, can be obtained.

As a further alternative, in the spatial-domain processing means 11, an interpolated value may be calculated with an interpolating operation with respect to the picture element of interest by using the picture element values of the neighboring picture elements, and the thus obtained interpolated value may be taken as the filtering processed signal value. In such cases, as the interpolating operation, an interpolating operation, which attaches importance to stability and with which the interpolated value corresponding to the picture element of interest and the picture element values of the neighboring picture elements are connected by a smooth curved line free from undershooting and overshooting, may be employed. Specifically, byway of example, an interpolating operation, which utilizes the combination of a B spline interpolating function and a cubic spline interpolating function, may be employed. In general, the B spline interpolating function yields a comparatively low level of sharpness and a high level of stability. In the B spline interpolating function, the spline interpolating function need not pass through the original picture elements, and it is necessary that the first-order differential coefficient and the second-order differential coefficient of the spline interpolating function are continuous between adjacent sections. The cubic spline interpolating function yields a comparatively high level of sharpness. In the cubic spline interpolating function, it is necessary that the spline interpolating function passes through the original picture elements, and that the first-order differential coefficient of the spline interpolating function is continuous between adjacent sections. When the interpolation coefficient formula for the cubic spline interpolating function is represented by "f" and the interpolation coefficient formula for the B spline interpolating function is represented by "b," the interpolation coefficient formula for the interpolating operation, which utilizes the linear combination of the B spline interpolating function and the cubic spline interpolating function, is represented by the formula of $\alpha \cdot f + (1-\alpha) \cdot b$. By the adjustment of the ratio $\alpha$, the image sharpness in the reproduced image can be adjusted. However, the ratio should be set such that importance may be attached to the stability. If $\alpha \geq 1$, the degree of emphasis will become very high. If $\alpha < 0$, the degree of blurring will become very high. Therefore, the ratio should preferably be set such that $0 < \alpha < 1$.

Further, in the first and second embodiments described above, the filtering processing, in which the filtering operation is carried out by using the picture element values of a plurality of picture elements in the vicinity of the picture element of interest in the spatial domain, is employed as the spatial-domain processing. However, the spatial-domain processing is not limited to the filtering processing and may be carried out in various other ways, in which the operation is carried out by using the original picture element values of the picture elements constituting the image. A third embodiment of the gradation transforming apparatus in accordance with the present invention will be described hereinbelow with reference to FIG. 4.

Figure 4:
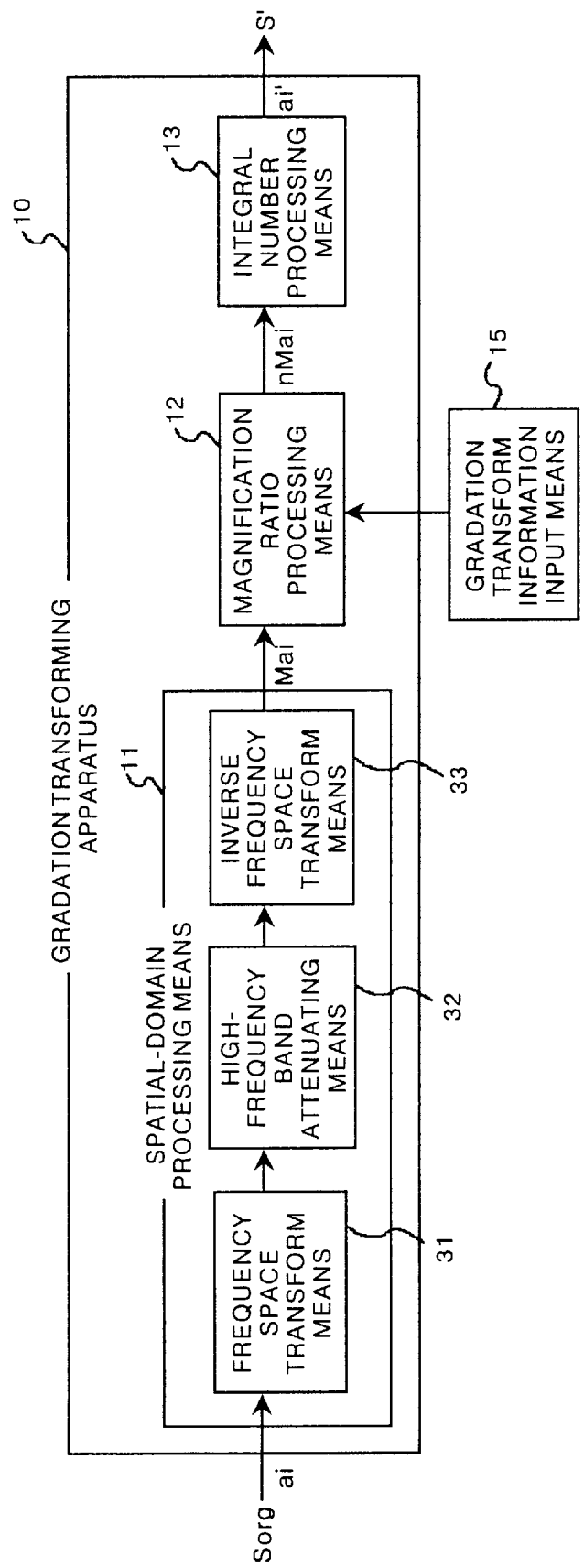
FIG. 4 is a block diagram showing a gradation transforming apparatus for carrying out a third embodiment of the gradation transforming method in accordance with the present invention.

As illustrated in FIG. 4, in the gradation transforming apparatus 10, which is the third embodiment, the spatial-domain processing means 11 is constituted of a frequency space transform means 31, a high-frequency band attenuating means 32, and an inverse frequency space transform means 33. In the third embodiment, in the frequency space transform means 31, the original image signal Sorg, which is made up of picture element values expressed with integral numbers, is transformed into a multi-resolution space by a wavelet transform, a Laplacian pyramid transform, a sub-band transform, or the like. In this manner, multi-resolution signal values are obtained. In the high-frequency band attenuating means 32, a high-frequency band in the multi-resolution signal values is attenuated for noise removal. Thereafter, in the inverse frequency space transform means 33, the multi-resolution signal values expressed with real numbers are transformed into the spatial domain, and spatial-domain processed signal values $Ma_{i,j}$ are thereby obtained. In the same manner as that in the first embodiment described above, in the magnification ratio processing means 12, the spatial-domain processed signal values $Ma_{i,j}$ are multiplied by a desired factor, and n-fold signal values $nMa_{i,j}$ are thereby obtained. In the integral number processing means 13, the n-fold signal values $nMa_{i,j}$ are approximately represented by integral numbers, and the image signal S' resulting from the gradation transform is thus obtained.

As in the first embodiment described above, in the thus obtained image signal S', as for a gradation part in the original image, i.e. as for an image portion in which the original picture element values of consecutive picture elements change little by little, the new picture element values are obtained from the gradation transform such that they may change continuously. Also, as for an edge in the original image, at which the picture element values are discontinuous, the new picture element values are obtained from the gradation transform such that the discontinuity may be kept. Accordingly, a reproduced image can be obtained from the image signal S' such that no artifact may occur at the gradation part and such that the sharpness may be kept in the entire area of the image.

In the third embodiment described above, the high-frequency band attenuating means 32 is employed in order to eliminate noise components contained in the spatial frequency signal. However, the high-frequency band attenuating means 32 need not necessarily be utilized. Specifically, the original image signal Sorg may be transformed by the frequency space transform means 31 into the multi-resolution signal values, and the multi-resolution signal values expressed with real numbers may be directly transformed into the spatial domain by the inverse frequency space transform means 33. In this manner, the spatial-domain processed signal values $Ma_{i,j}$ may be obtained.

What is claimed is:

1. A gradation transforming method for an image, wherein each of original picture element values of picture elements constituting an image, which values are expressed with integral numbers, is multiplied by a factor of n, where n is larger than 1 and represents a real number other than integral numbers, the value obtained from the multiplication is then approximately represented by an integral number, and the thus obtained integral number is taken as a new picture element value of the corresponding picture element constituting the image, the method comprising the steps of:

i) carrying out a spatial-domain processing on an image signal, which is made up of a series of the original picture element values of the picture elements constituting the image, spatial-domain processed signal values, which correspond to the respective picture elements and are represented by real numbers, being thereby obtained, ii) multiplying each of said spatial-domain processed signal values by a factor of n, n-fold signal values being thereby obtained, and iii) approximately representing each of said n-fold signal values by an integral number, the new picture element value being thereby obtained.

2. A method as defined in claim 1 wherein said spatial-domain processing is a filtering processing.

3. A method as defined in claim 2 wherein said filtering processing comprises the steps of:

a) utilizing a filter having a predetermined size, b) carrying out a predetermined operation by using the original picture element values of all picture elements, which are located in a region covered by said filter when a predetermined position on said filter is located at a position corresponding to a picture element of interest, and filter factors of said filter, which correspond to the all picture elements, and c) taking a value, which has been obtained from said predetermined operation, as the spatial-domain processed signal value, which corresponds to said picture element of interest.

4. A method as defined in claim 3 wherein said filter factors of said filter, which correspond to the all picture elements, take the same value, and a mean value of the original picture element values of the all picture elements, which are located in the region covered by said filter, is taken as the spatial-domain processed signal value, which corresponds to said picture element of interest.

5. A method as defined in claim 3 wherein said filter factors of said filter, which correspond to the all picture elements, are determined such that the original picture element value of said picture element of interest may be weighted.

6. A method as defined in claim 2 wherein said filtering processing comprises the steps of:

a) utilizing a filter having a predetermined size, b) carrying out a predetermined operation by using the original picture element values of all picture elements, which are located in a region covered by said filter when a predetermined position on said filter is located at a position corresponding to a picture element of interest, and filter factors of said filter, which correspond to the all picture elements, c) taking a value, which has been obtained from said predetermined operation, as the spatial-domain processed signal value, which corresponds to said picture element of interest, in cases where a difference between said value, which has been obtained from said predetermined operation, and the original picture element value of said picture element of interest is smaller than a predetermined value, and d) taking the original picture element value of said picture element of interest as the spatial-domain processed signal value, which corresponds to said picture element of interest, in cases where the difference between said value, which has been obtained from said predetermined operation, and the original picture element value of said picture element of interest is not smaller than the predetermined value.

7. A method as defined in claim 6 wherein said filter factors of said filter, which correspond to the all picture elements, take the same value, and a mean value of the original picture element values of the all picture elements, which are located in the region covered by said filter, is taken as the spatial-domain processed signal value, which corresponds to said picture element of interest.

8. A method as defined in claim 6 wherein said filter factors of said filter, which correspond to the all picture elements, are determined such that the original picture element value of said picture element of interest may be weighted.

9. A method as defined in claim 2 wherein said filtering processing comprises the steps of:

a) carrying out an interpolating operation with a predetermined interpolating function, which attaches importance to stability, on the original picture element values of a plurality of picture elements, which are located in the vicinity of a picture element of interest, an interpolated value, which corresponds to said picture element of interest, being thereby obtained, and b) taking said interpolated value as the spatial-domain processed signal value, which corresponds to said picture element of interest.

10. A method as defined in claim 9 wherein said predetermined interpolating function is an interpolating function having interpolation coefficients, each of said interpolation coefficients having been obtained by linearly combining interpolation coefficients, which correspond to each other and are set for each of the picture elements, in a cubic spline interpolating function and a B spline interpolating function, the interpolation coefficients being linearly combined in a predetermined ratio.

11. A gradation transforming apparatus for an image, wherein each of original picture element values of picture elements constituting an image, which values are expressed with integral numbers, is multiplied by a factor of n, where n is larger than 1 and represents a real number other than integral numbers, the value obtained from the multiplication is then approximately represented by an integral number, and the thus obtained integral number is taken as a new picture element value of the corresponding picture element constituting the image, the apparatus comprising:

i) a spatial-domain processing means for carrying out a spatial-domain processing on an image signal, which is made up of a series of the original picture element values of the picture elements constituting the image, and thereby obtaining spatial-domain processed signal values, which correspond to the respective picture elements and are represented by real numbers, ii) a magnification ratio processing means for multiplying each of said spatial-domain processed signal values by a factor of n, and thereby obtaining n-fold signal values, and iii) an integral number processing means for approximately representing each of said n-fold signal values by an integral number, and thereby obtaining the new picture element value.

12. An apparatus as defined in claim 11 wherein said spatial-domain processing is a filtering processing.

13. An apparatus as defined in claim 12 wherein said filtering processing comprises the steps of:

a) utilizing a filter having a predetermined size, b) carrying out a predetermined operation by using the original picture element values of all picture elements, which are located in a region covered by said filter when a predetermined position on said filter is located at a position corresponding to a picture element of interest, and filter factors of said filter, which correspond to the all picture elements, and c) taking a value, which has been obtained from said predetermined operation, as the spatial-domain processed signal value, which corresponds to said picture element of interest.

14. An apparatus as defined in claim 13 wherein said filter factors of said filter, which correspond to the all picture elements, take the same value, and a mean value of the original picture element values of the all picture elements, which are located in the region covered by said filter, is taken as the spatial-domain processed signal value, which corresponds to said picture element of interest.

15. An apparatus as defined in claim 13 wherein said filter factors of said filter, which correspond to the all picture elements, are determined such that the original picture element value of said picture element of interest may be weighted.

16. An apparatus as defined in claim 12 wherein said filtering processing comprises the steps of:

a) utilizing a filter having a predetermined size, b) carrying out a predetermined operation by using the original picture element values of all picture elements, which are located in a region covered by said filter when a predetermined position on said filter is located at a position corresponding to a picture element of interest, and filter factors of said filter, which correspond to the all picture elements, c) taking a value, which has been obtained from said predetermined operation, as the spatial-domain processed signal value, which corresponds to said picture element of interest, in cases where a difference between said value, which has been obtained from said predetermined operation, and the original picture element value of said picture element of interest is smaller than a predetermined value, and d) taking the original picture element value of said picture element of interest as the spatial-domain processed signal value, which corresponds to said picture element of interest, in cases where the difference between said value, which has been obtained from said predetermined operation, and the original picture element value of said picture element of interest is not smaller than the predetermined value.

17. An apparatus as defined in claim 16 wherein said filter factors of said filter, which correspond to the all picture elements, take the same value, and a mean value of the original picture element values of the all picture elements, which are located in the region covered by said filter, is taken as the spatial-domain processed signal value, which corresponds to said picture element of interest.

18. An apparatus as defined in claim 16 wherein said filter factors of said filter, which correspond to the all picture elements, are determined such that the original picture element value of said picture element of interest may be weighted.

19. An apparatus as defined in claim 12 wherein said filtering processing comprises the steps of:

a) carrying out an interpolating operation with a predetermined interpolating function, which attaches importance to stability, on the original picture element values of a plurality of picture elements, which are located in the vicinity of a picture element of interest, an interpolated value, which corresponds to said picture element of interest, being thereby obtained, and b) taking said interpolated value as the spatial-domain processed signal value, which corresponds to said picture element of interest.

20. An apparatus as defined in claim 19 wherein said predetermined interpolating function is an interpolating function having interpolation coefficients, each of said interpolation coefficients having been obtained by linearly combining interpolation coefficients, which correspond to each other and are set for each of the picture elements, in a cubic spline interpolating function and a B spline interpolating function, the interpolation coefficients being linearly combined in a predetermined ratio.

* * * * *